United States Patent
Won et al.

(10) Patent No.: US 12,028,924 B2
(45) Date of Patent: Jul. 2, 2024

(54) METHOD AND APPARATUS FOR CONTROLLING MULTI-CONNECTIVITY IN WIRELESS COMMUNICATION SYSTEM

(71) Applicant: ELECTRONICS AND TELECOMMUNICATIONS RESEARCH INSTITUTE, Daejeon (KR)

(72) Inventors: Seuck Ho Won, Daejeon (KR); Il Gyu Kim, Daejeon (KR); Hee Sang Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 206 days.

(21) Appl. No.: 17/234,945

(22) Filed: Apr. 20, 2021

(65) Prior Publication Data

US 2021/0329728 A1    Oct. 21, 2021

(30) Foreign Application Priority Data

Apr. 21, 2020  (KR) .................. 10-2020-0048276
Apr. 20, 2021  (KR) .................. 10-2021-0050890

(51) Int. Cl.
*H04W 76/25*   (2018.01)
*G06N 20/00*   (2019.01)
(Continued)

(52) U.S. Cl.
CPC ............ *H04W 76/25* (2018.02); *G06N 20/00* (2019.01); *H04W 24/02* (2013.01); *H04W 72/542* (2023.01); *H04W 64/003* (2013.01)

(58) Field of Classification Search
None
See application file for complete search history.

(56) References Cited

U.S. PATENT DOCUMENTS 8,483,223 B2   7/2013 Black et al.
11,304,037 B2   4/2022 Fechtel et al.
(Continued)

FOREIGN PATENT DOCUMENTS

JP    2019-71563 A    5/2019
JP    2019071563 A  *  5/2019
(Continued)

*Primary Examiner* — Derrick W Ferris
*Assistant Examiner* — Keith Follansbee
(74) *Attorney, Agent, or Firm* — LRK PATENT LAW FIRM

(57) ABSTRACT

A method for managing links, performed by a first communication node in a communication system, includes: obtaining, through an interface, communication status information including communication quality information for each link between the first communication node and at least one other communication node of the communication system; obtaining communication environment information including movement information and location information of each of the at least one other communication node; and obtaining a link probability computational model outputting a first link probability according to input of the communication status information by iteratively performing a machine learning operation based on the communication status information and the communication environment information, wherein the first link probability is used by the first communication node to control multi-connectivity with the at least one other communication node.

16 Claims, 6 Drawing Sheets

(51) Int. Cl.
*H04W 24/02* (2009.01)
*H04W 64/00* (2009.01)
*H04W 72/542* (2023.01)

(56) References Cited

U.S. PATENT DOCUMENTS

| | | | |
|---|---|---|---|
| 2015/0200913 A1 | 7/2015 | Jeon | |
| 2016/0219475 A1 | 7/2016 | Kim | |
| 2019/0166641 A1 | 5/2019 | Kim et al. | |
| 2019/0342816 A1 | 11/2019 | Yun et al. | |
| 2020/0154348 A1* | 5/2020 | Choi | H04W 24/10 |
| 2020/0280827 A1* | 9/2020 | Fechtel | H04W 4/80 |
| 2020/0359445 A1* | 11/2020 | Wu | H04B 7/0626 |
| 2021/0211910 A1* | 7/2021 | Lucas | H04W 24/06 |
| 2023/0097606 A1* | 3/2023 | Takahashi | H04L 41/145 |
| | | | 370/252 |

FOREIGN PATENT DOCUMENTS

| | | |
|---|---|---|
| KR | 10-1154679 B1 | 6/2012 |
| KR | 10-2020-0015508 A | 2/2020 |
| WO | 2015/002466 A2 | 1/2015 |
| WO | 2016/056817 A1 | 4/2016 |
| WO | 2018/016853 A1 | 1/2018 |
| WO | 2019/006085 A1 | 1/2019 |
| WO | 2019/048384 A1 | 3/2019 |

* cited by examiner

METHOD AND APPARATUS FOR CONTROLLING MULTI-CONNECTIVITY IN WIRELESS COMMUNICATION SYSTEM

CROSS-REFERENCE TO RELATED APPLICATIONS

This application claims priority to Korean Patent Applications No. 10-2020-0048276 filed on Apr. 21, 2020 and No. 10-2021-0050890 filed on Apr. 20, 2021 with the Korean Intellectual Property Office (KIPO), the entire contents of which are hereby incorporated by reference.

BACKGROUND

1. Technical Field

The present disclosure relates to a method and an apparatus for controlling multi-connectivity in a wireless communication system, and more specifically, to a method and an apparatus for adaptively controlling dual connectivity (DC) or multi-connectivity (MC) in a wireless communication system to which a mobile backhaul network is applied.

2. Description of Related Art

With the development of information and communication technology, various wireless communication technologies have been developed. Typical wireless communication technologies include long term evolution (LTE) and new radio (NR), which are defined in the 3rd generation partnership project (3GPP) standards. The LTE may be one of 4th generation (4G) wireless communication technologies, and the NR may be one of 5th generation (5G) wireless communication technologies.

The 5G communication system (hereinafter, new radio (NR) communication system) using a higher frequency band (e.g., a frequency band of 6 GHz or above) than a frequency band (e.g., a frequency band of 6 GHz or below) of the 4G communication system (e.g., long term evolution (LTE) communication system) is being considered for processing of wireless data soaring after commercialization of the 4G communication system.

In the wireless communication system such as 5G or NR, it may be necessary to use a high frequency band such as a millimeter wave (mm-wave) in order to satisfy the requirements of the communication system standard. In a high frequency band such as a millimeter wave, characteristics such as higher signal attenuation, higher path loss, lower diffraction, and stronger straightness may appear than in a lower frequency band. Accordingly, in order to ensure smooth communications in the high frequency band, it may be necessary to deploy stations with high density in a communication environment.

An access-backhaul mixed network comprising a plurality of wireless backhaul base stations and wireless terminals may enable highly-dense base stations to provide coverages and services to wireless terminals through radio signals of a high frequency band in the communication environment. However, there is a problem in that installation costs increase in order to increase the density or number of wireless backhaul base stations. Accordingly, mobile backhaul technologies or access-mobile backhaul technologies in which a wireless terminal performs a role of a wireless backhaul base station or a mobile backhaul base station for access of other wireless terminals are being studied. A mobile backhaul network to which the mobile backhaul technologies are applied may be composed of a core network, a fixed backhaul base station(s), and wireless terminals that receive services or function as mobile backhaul base stations. Due to mobility of the wireless terminals that may serve as mobile backhaul base stations, the structure of the mobile backhaul network may have high variability. In this reason, technologies for efficiently controlling connections, dual-connectivity (DC), and/or multi-connectivity (MC) between the wireless terminals and the fixed or mobile backhaul base stations adaptively to communication environmental changes such as movement of the wireless terminals may be required.

SUMMARY

In order to solve the above-identified problems, exemplary embodiments of the present disclosure are directed to providing a method and an apparatus for adaptively controlling dual connectivity or multi-connectivity based on machine-learning in a wireless communication system to which a mobile backhaul network is applied.

According to an exemplary embodiment of the present disclosure for achieving the above-described objective, a method for managing links, performed by a first communication node in a communication system, may comprise: obtaining, through an interface, communication status information including communication quality information for each link between the first communication node and at least one other communication node of the communication system; obtaining communication environment information including movement information and location information of each of the at least one other communication node; and obtaining a link probability computational model outputting a first link probability according to input of the communication status information by iteratively performing a machine learning operation based on the communication status information and the communication environment information, wherein the first link probability is used by the first communication node to control multi-connectivity with the at least one other communication node.

The first link probability may correspond to a link available probability (LAP) indicating a probability that each link with the at least one other communication node is not blocked.

The first link probability may correspond to a link blocking probability (LBP) indicating a probability that each link with the at least one other communication node is blocked.

The obtaining of the link probability computational model may comprise: performing evaluation on each link with the at least one other communication node based on the first link probability output from the link probability computational model; determining multi-connectivity with the at least one other communication node based on a result of evaluating each link with the at least one other communication node; obtaining service quality information according to a result of determining the multi-connectivity; performing evaluation on the first link probability output from the link probability computational model, based on the service quality information; determining whether to update at least one weight coefficient constituting the link probability computational model based on a result of the evaluation on the first link probability; and updating the at least one weight coefficient.

The communication status information may further include at least one of available bandwidth information, path information, and bottleneck node information, and the obtaining of the link probability computational model may comprise: scaling at least one piece of information included in the communication status information to have a value of 0 to 1; configuring the scaled at least one piece of information into one vector data; and iteratively performing the machine learning operation based on the communication status information configured as the vector data.

The obtaining of the link probability computational model may comprise: classifying the communication environment information to identify communication environment conditions; iteratively performing the machine learning operation for each of the identified communication environment conditions; and obtaining a plurality of link probability computational models classified according to the identified communication environment conditions.

The method may further comprise calculating a first real-time link probability, and the calculating of the first real-time link probability comprises: obtaining first communication status information corresponding to real-time communication status information for each link between the first communication node and the at least one other communication node through the interface; obtaining first communication environment information including real-time movement information and real-time location information of each of the at least one other communication node; inputting the first communication status information into a first link probability computational model corresponding to the obtained first communication environment information; and obtaining the first real-time link probability output from the first link probability computational model.

The method may further comprise providing a second link probability computational model to a second communication node of the communication system, and the providing of the second link probability computational model comprises: receiving, from the second communication node, second communication environment information including real-time movement information and real-time location information of each of at least one communication node performing real-time communication with the second communication node through the interface; identifying the second link probability computational model corresponding to the received second communication environment information; and transmitting information on the identified second link probability computational model to the second communication node through the interface.

The method may further comprise transferring information of at least one weight coefficient constituting the obtained link probability computational model to the at least one other communication node through the interface.

The method may further comprise transferring the first link probability for each link with the at least one other communication node to the at least one other communication node through the interface.

The communication environment information may further include movement information and location information of each of at least one communication obstacle existing in a predetermined communication area.

According to another exemplary embodiment of the present disclosure for achieving the above-described objective, a first communication node in a communication system may comprise: an interface; a processor; a memory electronically communicating with the processor; and instructions stored in the memory, wherein when executed by the processor, the instructions cause the first communication node to: obtain, through an interface, communication status information including communication quality information for each link between the first communication node and at least one other communication node of the communication system; obtain communication environment information including movement information and location information of each of the at least one other communication node; and obtain a link probability computational model outputting a first link probability according to input of the communication status information by iteratively performing a machine learning operation based on the communication status information and the communication environment information, wherein the first link probability is used by the first communication node to control multi-connectivity with the at least one other communication node.

The instructions may further cause the first communication node to: perform evaluation on each link with the at least one other communication node based on the first link probability output from the link probability computational model; determine multi-connectivity with the at least one other communication node based on a result of evaluating each link with the at least one other communication node; obtain service quality information according to a result of determining the multi-connectivity; perform evaluation on the first link probability output from the link probability computational model, based on the service quality information; determine whether to update at least one weight coefficient constituting the link probability computational model based on a result of the evaluation on the first link probability; and update the at least one weight coefficient.

The communication status information may further include at least one of available bandwidth information, path information, and bottleneck node information, and the instructions may further cause the first communication node to: scale at least one piece of information included in the communication status information to have a value of 0 to 1; configure the scaled at least one piece of information into one vector data; and iteratively perform the machine learning operation based on the communication status information configured as the vector data.

The instructions may further cause the first communication node to: classify the communication environment information to identify communication environment conditions; iteratively perform the machine learning operation for each of the identified communication environment conditions; and obtain a plurality of link probability computational models classified according to the identified communication environment conditions.

The instructions may further cause the first communication node to: obtain first communication status information corresponding to real-time communication status information for each link between the first communication node and the at least one other communication node through the interface; obtain first communication environment information including real-time movement information and real-time location information of each of the at least one other communication node; input the first communication status information into a first link probability computational model corresponding to the obtained first communication environment information; and obtain a first real-time link probability output from the first link probability computational model.

The instructions may further cause the first communication node to: receive, from a second communication node of the communication system, second communication environment information including real-time movement information and real-time location information of each of at least one communication node performing real-time communication with the second communication node through the interface; identify a second link probability computational model corresponding to the received second communication environment information; and transmit information on the identified second link probability computational model to the second communication node through the interface.

The instructions may further cause the first communication node to: obtain, through the interface, first communication status information corresponding to real-time communication status information for each link between the first communication node and the at least one other communication node; obtain first communication environment information including real-time movement information and real-time location information of each of the at least one other communication node; transmit the first communication environment information to a third communication node of the communication system through the interface; receive, from the third communication node, a third link probability computational model corresponding to the first communication environment information through the interface; input the first communication status information to the third link probability computational model; and obtain a third real-time link probability output from the third link probability computational model.

According to exemplary embodiments of the present disclosure, in a wireless communication system to which a mobile backhaul network is applied, a method and an apparatus for efficiently controlling dual-connectivity (DC) or multi-connectivity (MC) between communication nodes and fixed or mobile backhaul base stations based on machine learning adaptively to communication environmental changes may be provided. A machine learning structure of a first communication node may calculate a link available probability or a link blocking probability for each link between the first communication node and the fixed or mobile backhaul base station with low complexity, based on communication status information and/or communication environment information. Dual connectivity or multi-connectivity may be configured using links determined to be good based on the calculation result. Accordingly, the structure of the mobile backhaul network having high variability according to communication environmental changes may be controlled efficiently and with low complexity.

DETAILED DESCRIPTION OF THE EMBODIMENTS

Figure 1:
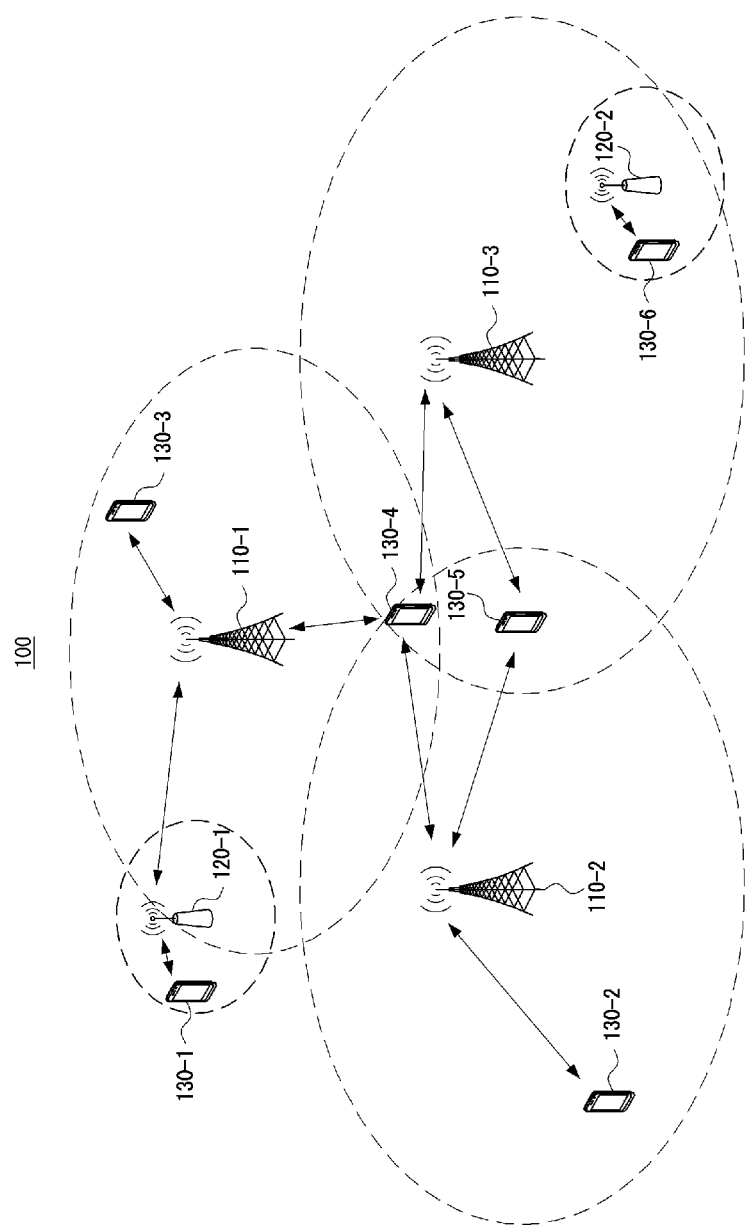
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present specification, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present specification, a terminal may refer to a mobile station, mobile terminal, subscriber station, portable subscriber station, user equipment, an access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present specification, the base station may refer to an access point, radio access station, node B, evolved node B (eNodeB), base transceiver station, mobile multihop relay (MMR)-BS, or the like, and may include all or part of functions of the base station, access point, radio access station, nodeB, eNodeB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

Also, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
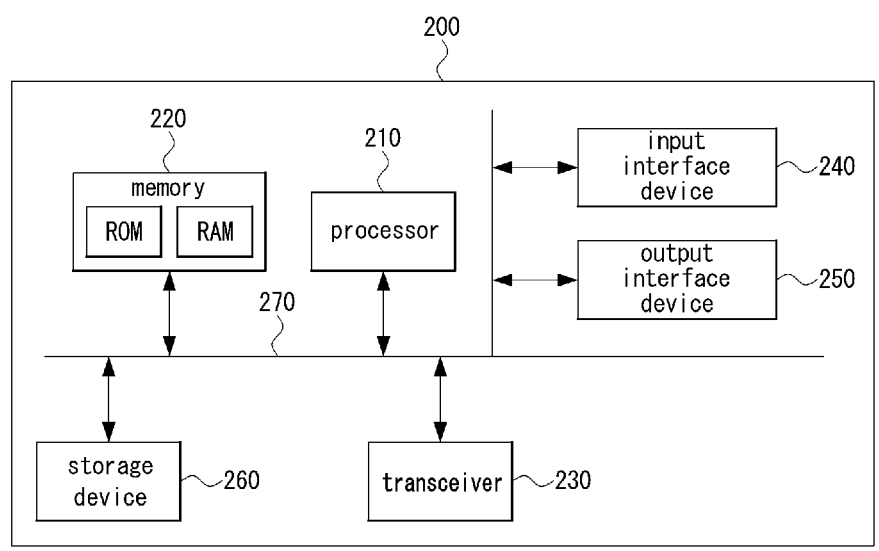
FIG. 2 is a block diagram illustrating an exemplary embodiment of a communication node constituting a communication system.

FIG. 2 is a block diagram illustrating a first embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (CoMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, methods for configuring and managing radio interfaces in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a terminal is described, the corresponding base station may perform an operation corresponding to the operation of the terminal. Conversely, when an operation of the base station is described, the corresponding terminal may perform an operation corresponding to the operation of the base station.

Meanwhile, in a communication system, a base station may perform all functions (e.g., remote radio transmission and reception function, baseband processing function, and the like) of a communication protocol. Alternatively, the remote radio transmission and reception function among all the functions of the communication protocol may be performed by a transmission reception point (TRP) (e.g., flexible TRP (f-TRP)), and the baseband processing function among all the functions of the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of backhaul links and fronthaul links may be as follows. When a functional-split scheme of the communication protocol is applied, the TRP may selectively perform some functions of the BBU or some functions of a medium access control (MAC) layer or a radio link control (RLC) layer.

Figure 3:
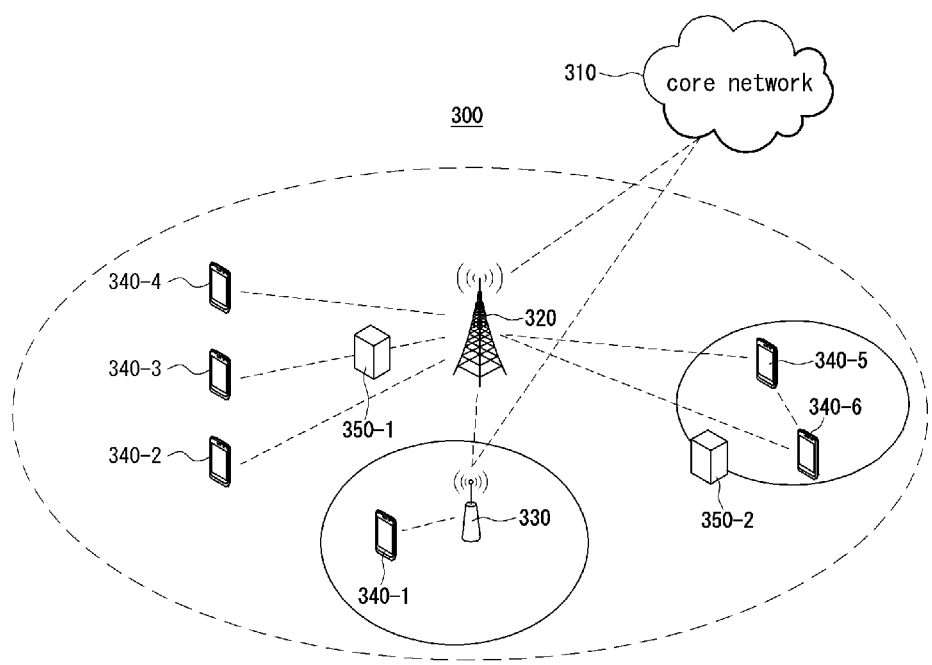
FIG. 3 is a conceptual diagram illustrating an exemplary embodiment of a communication system including a mobile backhaul network.

FIG. 3 is a conceptual diagram illustrating an exemplary embodiment of a communication system including a mobile backhaul network.

Referring to FIG. 3, a communication system may include a core network (CN) 310 and an access network. Here, the core network 310 may be the same as or similar to the core network described with reference to FIG. 1. The core network supporting the 4G communication may include an MME, an S-GW, a P-GW, and the like. The core network supporting the 5G communication may include an AMF, an UPF, a PDN-GW, and the like.

The access network may include at least one fixed base station 320 and 330, and at least one wireless terminal 340-1, 340-2, 340-3, 340-4, 340-5, and 340-6. The at least one fixed base station 320 or 330 may be the same as or similar to the base stations 110-1, 110-2, 110-3, 120-1, or 120-2 described with reference to FIG. 1. The at least one wireless terminal 340-1, 340-2, 340-3, 340-4, 340-5, or 340-6 may be the same as or similar to the terminal 130-1, 130-2, 130-3, 130-4, 130-5, or 130-6 described with reference to FIG. 1. The communication nodes constituting the communication system 300 may be configured identically or similarly to the communication node 200 shown in FIG. 2. The at least one fixed base stations 320 and 330 may include the macro base station 320, the small base station 330, and the like. The macro base station 320 and/or the small base station 330 may be connected to a termination node of the core network through a wired backhaul link or a wireless backhaul link. FIG. 3 shows an exemplary embodiment in which only one macro base station 320 and only one small base station 330 are arranged in the communication system 300 for convenience of description, but exemplary embodiments of the present disclosure are not limited thereto. For example, the communication system 300 may include at least one macro base station and/or at least one small base station. Alternatively, the communication system 300 may include communication nodes identical or similar to the BBU block and/or TRP described with reference to FIG. 1. For example, the TRP may support a remote wireless transmission/reception function among all functions of the communication protocol, and a baseband processing function for the TRP may be performed in the BBU block. The BBU block may belong to the access network or the core network. The BBU block may be located in the AMF, UPF, MME, S-GW, or macro base station. Alternatively, the BBU block may be located independently of each of the AMF, UPF, MME, S-GW, and macro base station. For example, the BBU block may be configured as a logical function block between the macro base station and the AMF (or UPF). The BBU block may support a plurality of TRPs, and may be connected to each of the plurality of TRPs using a wired fronthaul link or a wireless fronthaul link. The link between the BBU block and the TRP may be referred to as a 'fronthaul link'. Each TRP may be connected to the BBU block through a wired fronthaul link or a wireless fronthaul link, and may provide communication services to wireless terminals within a predetermined communication area based on the communication protocol (e.g., 4G communication protocol, 5G communication protocol).

The macro base station 320 may be connected to the core network 310 (e.g., AMF, UPF, MME, S-GW, etc.) using a wired backhaul link or a wireless backhaul link. The macro base station 320 may provide communication services to the wireless terminals 340-1, 340-2, 340-3, 340-4, 340-5, and 340-6 within a cell coverage based on a predetermined communication protocol (e.g., 4G communication protocol, 5G communication protocol, etc.). The macro base station 320 may form a relatively wider cell coverage than the small base station 330. The small base station 330 may be connected to the core network 310 or the macro base station 320 using a wired backhaul link or a wireless backhaul link. The small base station 330 may provide communication services to the wireless terminal 340-1 within a cell coverage based on a predetermined communication protocol (e.g., 4G communication protocol, 5G communication protocol, etc.). The small base station 330 may form a relatively narrow cell coverage than the macro base station 320. In an exemplary embodiment of the communication system 300, an access-backhaul mixed network including a plurality wireless terminals and a plurality of base stations connected to the core network using wired or wireless backhaul links may be configured. The access-backhaul mixed network may enable highly-dense base stations to provide coverages and services to the wireless terminals through radio signals of a high frequency band in a communication environment.

The fixed base stations 320 and 330 may be directly connected to the wireless terminals 340-1, 340-2, 340-3, 340-4, 340-5, and 340-6 within cell coverages to provide communication services, or may provide communication services to the wireless terminals 340-1, 340-2, 340-3, 340-4, 340-5, and 340-6 indirectly through another communication node. For example, the macro base station 320 may directly provide communication services to the second terminal 340-2, the fourth terminal 340-4, the fifth terminal 340-5, and the sixth terminal 340-6 by being connected through direct links with the second terminal 340-2, the fourth terminal 340-4, the fifth terminal 340-5, and the sixth terminal 340-6 that facilitate direct communication among wireless terminals within the cell coverage. On the other hand, the macro base station 320 may indirectly provide communication services to the first terminal 340-1 by being connected with the small base station 330 through a wireless backhaul link.

The fronthaul link or the backhaul link may also be referred to as an 'Xhaul link'. A network including the Xhaul links may be referred to as an 'Xhaul network'. The Xhaul network may be located between the access network and the core network, and may support communications between the access network and the core network. Communication nodes belonging to the Xhaul network may be connected using Xhaul links. A communication system including the access network, the Xhaul network, and the core network may be referred to as an 'integrated communication system'. Communication nodes (e.g., MME, S-GW, P-GW, AMF, UPF, BBU block, distributed unit (DU), central unit (CU), base station, TRP, terminal, etc.) belonging to the integrated communication system may be configured identically or similarly to the communication node 200 shown in FIG. 2.

In addition, the UPF (or S-GW) of the integrated communication system may refer to a termination communication node of the core network that exchanges packets (e.g., control information, data) with the base station, and the AMF (or MME) of the integrated communication system may refer to a communication node of the core network that performs control functions in a wireless access section (or interface) of the terminal. Here, each of the backhaul link, fronthaul link, Xhaul link, BBU block, S-GW, MME, AMF, and UPF may be referred to as a different term depending on its function (e.g., function of the Xhaul network, function of the core network) according to a communication protocol based on a radio access technology (RAT).

In the wireless communication system such as 5G or NR, it may be necessary to use a high frequency band such as a millimeter wave (mm-wave) in order to satisfy the requirements of the communication system standard. In a high frequency band such as a millimeter wave, characteristics such as higher signal attenuation, higher path loss, lower diffraction, and stronger straightness may appear than in a lower frequency band. Accordingly, in order to ensure smooth communications in a high frequency band, it may be necessary to deploy stations with high density in a communication environment.

The communication system may include a plurality of macro base stations and/or small base stations. In an exemplary embodiment of the communication system, a mixed network comprising an access network and a backhaul network (i.e., access-backhaul mixed network) including a plurality of wireless terminals and a plurality of base stations connected to a core network using wired or wireless backhaul links may be configured. The access-backhaul mixed network may enable highly-dense base stations to provide coverages and services to wireless terminals through radio signals of a high frequency band in the communication environment. However, there is a problem in that installation costs increase in order to increase the density or number of wireless backhaul base stations. Accordingly, mobile backhaul technologies or access-mobile backhaul technologies in which a wireless terminal performs a role of a wireless backhaul base station or a mobile backhaul base station for access of other wireless terminals are being studied.

For access of other wireless terminals, some or all of the wireless terminals 340-1, 340-2, 340-3, 340-4, 340-5, and 340-6 of the communication system 300 may perform a role of a mobile backhaul base station based on the mobile backhaul technologies. The mobile backhaul base station may be connected to a fixed base station or another mobile backhaul base station through a wireless backhaul link, and may provide communication services to other wireless terminals. For example, the second terminal 340-2 and/or the fourth terminal 340-4 may be connected to the macro base station 320 through wireless backhaul links, and provide communication services to the third terminal 340-3 as a mobile backhaul base station. Alternatively, the fifth terminal 340-5 may be connected to the macro base station 320 through a wireless backhaul link, and provide communication services to the sixth terminal 340-6 as a mobile backhaul base station. The third terminal 340-3 may establish multi-connectivity (MC) with the second terminal 340-2 and the fourth terminal 340-4. The sixth terminal 340-6 may establish multi-connectivity with the macro base station 320 and the fifth terminal 340-5. A structure including a mobile backhaul base station and a fixed base station may be expressed as a 'mobile backhaul network'.

The wireless terminals 340-1, 340-2, 340-3, 340-4, 340-5, and 340-6 may perform functions as mobile backhaul base stations according to their own functions and communication environments. The wireless terminals that can function as mobile backhaul base stations may also be referred to as 'possible backhaul base stations (PBBS)'.

Various communication obstacles 350-1 and 350-2, such as buildings, people, and other structures, may exist in the communication environment. Depending on a communication status, wireless links formed between communication nodes may be blocked, or reception qualities thereof may be deteriorated due to the communication obstacles 350-1 and 350-2.

For example, the third terminal 340-3 is located within the cell coverage of the macro base station 320, but the first obstacle 350-1 exists between the macro base station 320 and the third terminal 340-3. As a result, a direct link with the macro base station 320 may be blocked. In other words, a coverage hole may exist between the macro base station 320 and the third terminal 340-3, where a line-of-sight (LOS) condition is not satisfied due to the first obstacle 350-1. Since the third terminal 340-3 does not facilitate direct communication with the macro base station 320, it may have to be connected to the macro base station 320 through relaying of another communication node, in order to receive communication services from the macro base station 320. The third terminal 340-3 may request the second terminal 340-2 and/or the fourth terminal 340-4, which facilitate direct communication, to perform a role as a mobile backhaul base station. The second terminal 340-2 and/or the fourth terminal 340-4 may provide communication services to the third terminal 340-3 as a mobile backhaul base station through a wireless backhaul link with the fixed base station 320.

On the other hand, a wireless link between the sixth terminal 340-6 and the macro base station 320 satisfies a LOS condition so that the sixth terminal 340-6 and the macro base station 320 may perform direct communication. However, due to the presence of the second obstacle 350-2, a reception quality of the wireless link between the sixth terminal 340-6 and the macro base station 320 may be deteriorated. Alternatively, as the sixth terminal 340-6 moves, the wireless link between the sixth terminal 340-6 and the macro base station 320 may not satisfy the LOS condition. In this case, the fifth terminal 340-5 may provide communication services to the sixth terminal 340-6 as a mobile backhaul base station. The sixth terminal 340-6 may receive the communication service more stably by receiving the communication service indirectly through the fifth terminal 340-5, rather than receiving the communication service directly from the macro base station 320.

A communication network formed based on the mobile backhaul base stations by applying the mobile backhaul technologies may be referred to as a 'mobile backhaul network'. A communication system including a mobile backhaul network may be composed of a core network, a fixed base station(s), and wireless terminals functioning as a mobile backhaul base station or receiving services. Due to mobility of wireless terminals that may serve as mobile backhaul base stations, the structure of the mobile backhaul network may have high variability. For example, the wireless terminals may correspond to user equipments (UEs) possessed by users such as persons, or may correspond to terminals mounted on vehicles to provide V2X communication functions. The wireless terminal may have high mobility due to movement of the user or the vehicle. When the wireless terminals move, states of links between the wireless terminals and the fixed base station and/or states of links between the wireless terminals may change. Alternatively, due to movement of communication obstacles existing in the communication environment, or the like, the states of the links between wireless terminals and fixed base stations and/or the state of the links between wireless terminals may change. When the communication environment changes due to the movement of the wireless terminals, or the like, the structure of the mobile backhaul network may need to be reconfigured to suit the changed communication environment. Here, each communication node may be connected to a plurality of other communication nodes at the same time. When one communication node is simultaneously connected with two communication nodes, it may be referred to as 'dual-connectivity (DC)'. Meanwhile, when one communication node is simultaneously connected with two or more communication nodes, it may be referred to as 'multi-connectivity (MC)'. Unless otherwise defined, the multi-connectivity described in the present specification may be regarded as a term including the dual connectivity. There may be a need for technologies for efficiently controlling a connection or multi-connectivity between the wireless terminals and the fixed or mobile backhaul base station adaptively to changes in the communication environment.

Figure 4:
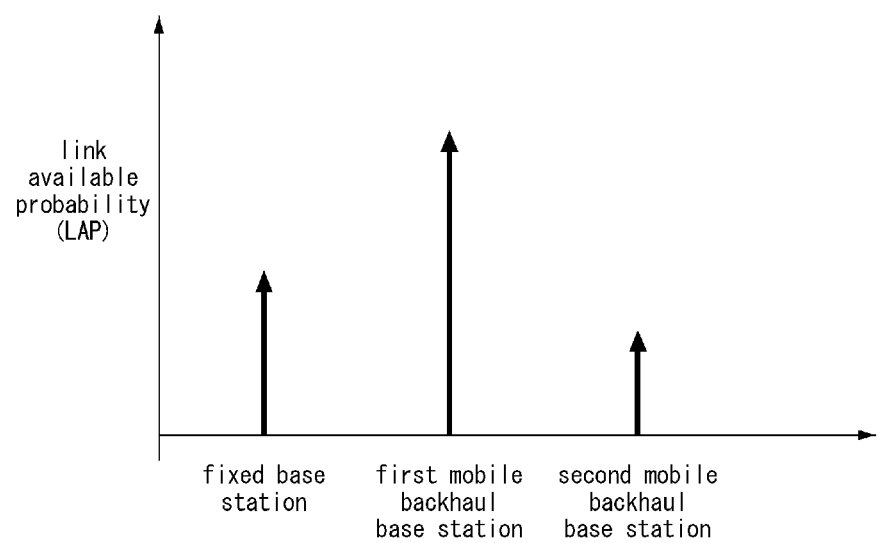
FIG. 4 is a graph for describing an exemplary embodiment of a method of controlling multi-connectivity (MC) based on a link available probability (LAP) between communication nodes.

FIG. 4 is a graph for describing an exemplary embodiment of a method of controlling multi-connectivity (MC) based on a link available probability (LAP) between communication nodes.

Referring to FIG. 4, a communication system may include a plurality of communication nodes. The communication system may include at least one fixed base station. Here, the fixed base station may be the same as or similar to the fixed base stations 320 and 330 described with reference to FIG. 3, for example. The communication system may include at least one mobile backhaul base station and the like. Here, the mobile backhaul base station is one wireless terminal, and may mean a wireless terminal that is connected to the fixed base station through a wireless backhaul link and can serve to provide services to other wireless terminals. For example, the mobile backhaul base station may be the same as or similar to the second, fourth, and fifth terminals 340-2, 340-4, and 340-5 that serve as mobile backhaul base stations described with reference to FIG. 3. The communication system may further include a first communication node configuring multi-connectivity with at least one fixed base station and/or at least one mobile backhaul base station. The first communication node may correspond to a base station or a wireless terminal. For example, the first communication node may be the same as or similar to at least one wireless terminal 340-1, 340-2, 340-3, 340-4, 340-5, and 340-6 described with reference to FIG. 3. Hereinafter, for convenience of description, a method of controlling multi-connectivity in an exemplary embodiment of a communication system in which one fixed base station, two mobile backhaul base stations, and one first communication node exist will be described. However, exemplary embodiments of the present disclosure are not limited thereto. For example, the exemplary embodiments of the present disclosure may be applied in the same or similar manner to exemplary embodiments of various communication systems such as a communication system in which a plurality of fixed base stations, mobile backhaul base stations, and/or wireless terminals exist.

The communication system may include a fixed base station, a first mobile backhaul base station, a second mobile backhaul base station, and/or a first communication node. The first communication node may be connected to some or all of the fixed base station, the first mobile backhaul base station, and the second mobile backhaul base station to receive communication services. The first communication node may configure multi-connectivity with the fixed base station, the first mobile backhaul base station, and/or the second mobile backhaul base station.

For each link between the communication nodes, a link available probability (LAP) may be calculated. The LAP may mean a probability that the corresponding link is not blocked and can be stably maintained. The LAP may be calculated based on communication status information and/or communication environment information identified as a result of signal transmission/reception between the communication nodes. For example, the LAP may be calculated based on reception quality information, channel state information, and/or channel quality information evaluated as a result of the signal transmission/reception between the communication nodes. Alternatively, the LAP may be calculated based on location information of each communication node, movement status information such as speed, and/or link path information such as the number of hops. The communication system may include an apparatus (hereinafter, referred to as a 'multi-connectivity control apparatus') for calculating LAP values by receiving information related to communication statuses or communication environments from the communication nodes, or controlling multi-connectivity based on the calculated LAP values. The multi-connectivity control apparatus may be included in the fixed base station and/or the mobile backhaul base stations. Alternatively, the multi-connectivity control apparatus may be connected to the fixed base station and/or the mobile backhaul base stations. Information on the calculated LAP may be shared between the fixed base station and/or the mobile backhaul base stations.

The graph of FIG. 4 shows a LAP value calculated for each of the links of multi-connectivity configured by the first communication node with the fixed base station, the first mobile backhaul base station, and the second backhaul base station in an exemplary embodiment of the communication system. According to the graph of FIG. 4, it can be seen that the LAP value for the link between the first communication node and the first mobile backhaul base station is the highest. This may mean that the first communication node is expected to receive the most stable communication service from the first mobile backhaul base station. Meanwhile, according to the graph of FIG. 4, it can be seen that the LAP value for the link between the first communication node and the second mobile backhaul base station is the lowest. This may mean that the communication service provided by the second mobile backhaul base station is evaluated as having the highest possibility of degradation or interruption in quality. The first communication node may configure multi-connectivity by first selecting links having relatively high LAP values. Alternatively, the first communication node may configure multi-connectivity by first selecting links having LAP values equal to or greater than a preset first probability threshold.

Meanwhile, the multi-connectivity control apparatus may calculate a link blocking probability (LBP) value based on the communication status information and/or communication environment information. Here, the LBP value may correspond to a probability that the corresponding link may be blocked. The LBP value and the LAP value may have a relationship as shown in Equation 1.

$$LAP+LBP=1 \quad \text{[Equation 1]}$$

The multi-connectivity control apparatus may calculate LAP values or LBP values based on a machine learning scheme. The multi-connectivity control apparatus of the first communication node may obtain LAP values or LBP values by inputting communication status information and/or communication environment information obtained from other communication nodes into a predetermined machine learning structure. The multi-connectivity control apparatus may directly obtain the LAP values through the machine learning structure. On the other hand, the multi-connectivity control apparatus may obtain the LBP values through the machine learning structure, and may obtain the LAP values by subtracting the LBP values from 1 (i.e., LAP=1 −LBP). The multi-connectivity control apparatus may control multi-connectivity based on the obtained LAP values or LBP values. Technical characteristics of a predetermined machine learning structure used by the multi-connectivity control apparatus to calculate the LAP values or the LBP values will be described in more detail below with reference to FIG. 5.

Figure 5:
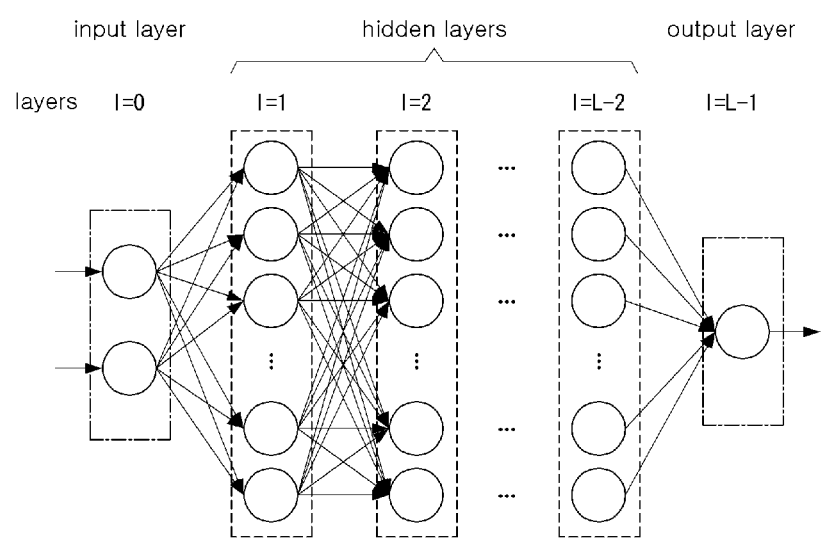
FIG. 5 is a conceptual diagram illustrating a machine learning structure used to calculate a link available probability (LAP) value or a link blocking probability (LBP) value in a first communication node.

FIG. 5 is a conceptual diagram illustrating a machine learning structure used to calculate a link available probability (LAP) value or a link blocking probability (LBP) value in a first communication node.

Referring to FIG. 5, a first communication node of a communication system may construct a computational model for calculating LAP values or LBP values through machine learning. Here, the communication system may be the same as or similar to the communication system 300 described with reference to FIG. 3. The first communication node may be the same as or similar to the communication node 200 described with reference to FIG. 2 and/or the first communication node described with reference to FIG. 4.

More specifically, a memory and/or storage device of the first communication node may include program instructions for performing machine learning according to a predetermined machine learning structure. Alternatively, the first communication node may include a separate machine learning unit for performing machine learning according to a predetermined machine learning structure. The machine learning unit may be the same as or similar to the multi-connectivity control apparatus described with reference to FIG. 4, for example. The first communication node may obtain a computational model for efficiently outputting LAP values through machine learning according to a structure such as an artificial neural network (ANN) or a deep neural network (DNN). For example, FIG. 5 shows a DNN structure composed of multi-layers and multi-nodes among machine learning structures. However, this is only an example for convenience of description, and exemplary embodiments of the present disclosure are not limited thereto. For example, in an exemplary embodiment of the communication system, various machine learning structures, such as an ANN structure, a DNN structure, a neuron structure composed of a single node, a perceptron structure composed of a single node, a knowledge-based system structure, a structure to which a reasoning technique (e.g., Bayesian etc.) is applied, and a deep neural network structure, may be applied to the machine learning unit. A machine learning structure selected according to predetermined criteria among the various machine learning structures may be applied to the machine learning unit. For example, a machine learning structure selected according to various conditions, such as development and/or production costs, performance requirements, and processor capabilities of the communication system and/or individual devices thereof, may be applied to the machine learning unit.

In an exemplary embodiment of the communication system, machine learning techniques such as ANN may be used to obtain a computational model for efficiently outputting LAP values. A neural network structure according to ANN, etc. may be composed of an input layer, hidden layer(s), and an output layer. Here, a neural network structure in which a plurality of hidden layers are arranged between the input layer and the output layer may be referred to as a DNN structure. Each of the layers may include at least one node. The input layer may be composed of a set of input nodes, each hidden layer may be composed of a set of hidden nodes, and the output layer may be composed of a set of output nodes. The nodes constituting each of the layers may also be referred to as 'neurons' or 'perceptrons'.

The total number of layers of the neural network structure may be L, and L may be a natural number of 3 or more. When the neural network corresponds to a DNN, L may be a natural number of 4 or more. Each of the layers may be expressed as an l-th layer (i.e., l=0, 1, . . . L−1) from the input layer to the output layer, and among them, the (l=1)-th to (l=L−2)-th layers may be hidden layers. For example, the DNN structure may include three hidden layers, and the hidden layers may be composed of 32, 64, and 32 hidden nodes, respectively. However, this is only an example for convenience of description, and the present disclosure is not limited thereto and may encompass various exemplary embodiments of machine learning or artificial neural network technologies.

Input data I may be input to the input layer of the neural network structure. The input data I input to the input layer may pass through the respective layers, and output data O may be output from the output layer after the successive functions of the respective layers are applied to the input data I. For example, the out data may be expressed as shown in Equation 2.

$$O = f(I, W) = f^{(L-1)}(f^{(L-2)}( \ldots f^{(1)}(I)))$$ [Equation 2]

Here, W may be at least one weight coefficient or weight parameter configured between the nodes of each layer. $f^{(l)}$ may be a function configured between the l-th layer and the (l−1)-th layer. For example, $f^{(l)}$ may correspond to a function such as a sigmoid function or a rectified linear unit (ReLu) function. The sigmoid function may refer to a function used for inter-layer operations such as output mapping in the machine learning structure. For example, the sigmoid function may be expressed as in Equation 3.

$$f_s(a) = \frac{1}{1 + e^{-a}}$$ [Equation 3]

The ReLu function may refer to a function used as an activation function in an operation between layers, such as the input layer and/or the hidden layers. For example, the ReLu function may be expressed as in Equation 4.

$$f_r = \max(0, a)$$ [Equation 4]

In an exemplary embodiment of the communication system, the neural network structure of the first communication node may receive the input data I and output the output data O. The input data I may correspond to communication status information. For example, the communication status information may include communication quality information, available bandwidth information, path information, and/or bottleneck node information. For example, the communication status information including communication quality information, available bandwidth information, path information, and/or bottleneck node information may be input to the respective input nodes of the input layer of the neural network structure. Alternatively, the communication status information including communication quality information, available bandwidth information, path information, and/or bottleneck node information may be processed or pre-processed and input to the respective input nodes of the input layer of the neural network structure. The input data I composed of a plurality of pieces of information may be input in form of a vector. The neural network structure may output the output data O by performing an operation based on a vector-type weight coefficient W on the input data I input in form of a vector. For example, in a part or the entire part of the neural network structure configured through neurons or perceptrons, according to an exemplary embodiment of the communication system, output values may be calculated using a sigmoid function in form of Equation 5.

$$y = \frac{1}{1 + e^{-x^T W}}$$ [Equation 5]

Here, x may be vector data corresponding to information input as the input data I. For example, x may be vector data composed of at least one piece of information such as communication quality information, available bandwidth information, path information, and/or bottleneck node information. Alternatively, x may be vector data composed of values obtained by processing or scaling information such as communication quality information, available bandwidth information, path information, and/or bottleneck node information to be values between 0 and 1. W may correspond to a vector configured with at least one weight coefficient. y may correspond to values obtained as a result of the operation or the output data O. The output data O may correspond to the LAP value or the LBP value described with reference to FIG. 4. That is, the neural network structure may receive communication status information and output an LAP value corresponding to a probability that the corresponding link is not blocked and can be stably maintained. Alternatively, the neural network structure may receive communication status information and output an LBP value corresponding to a probability that the corresponding link may be blocked. When the neural network structure is configured to output the LBP values, the LAP value may be obtained by subtracting the LBP value from 1. The first communication node may control multi-connectivity based on the output data O of the neural network structure. For example, the first communication node may configure or control multi-connectivity by first selecting links having relatively high LAP values or relatively low LBP values. Alternatively, the first communication node may configure or control multi-connectivity based on a result of comparison between the LAP value or the LBP value and a preset probability threshold. The first communication node may perform communication based on the result of configuring multi-connectivity. The first communication node may obtain communication quality information or service quality information according to a result of performing communication. For example, the first communication node may obtain a quality of service value such as Quality of Service (QoS) or Quality of Experience (QoE) according to the result of performing the communication. The first communication node may evaluate the output data O based on the obtained quality of service value. For example, when the acquired quality of service value is equal to or greater than a preset first reference quality value, the first communication node may determine that the output data O is valid. On the other hand, when the acquired quality of service value is less than the preset first reference quality value, the first communication node may determine that the output data O is not valid. When it is determined that the output data O is valid, the corresponding weight coefficient W may be updated.

The neural network structure may receive various input data I, perform operations based on the respective weight coefficients, and output output data O. In other words, communication status information reflecting various communication conditions that the first communication node may encounter may be input into the neural network structure, and LAP values or LBP values according to each communication condition may be calculated and output. The first communication node may construct a machine learning model or a computational model by repeatedly performing a plurality or multiple iterations of learning based on the operations on various input data I and evaluations on output data O.

For example, the first communication node may obtain the output data O based on the weight coefficients W changed in each learning iteration. The first communication node may update the weight coefficients W used in each learning iteration. The updated weight coefficients W may be recorded or stored. One computational model may correspond to a set of weight coefficients W updated through iterative learning. That is, the first communication node may obtain the computational model by recording or storing a set of weight coefficients W updated through iterative learning. The obtained computational model may be used to immediately estimate or calculate LAP values and control multi-connectivity based on communication status information identified while the first communication node performs communication in real time.

In an exemplary embodiment of the communication system, the first communication node may determine whether to update the weight coefficients W by comparing a quality of service value acquired according to the output data O with a preset first reference quality value. The first communication node may update only the weight coefficient W in the learning iteration in which the output data O is evaluated as valid. Accordingly, the efficiency of the learning operation and the performance of the computational model may be improved. The first quality reference value may be defined as a constant value or may be set differently according to the learning iteration.

The first communication node may construct a plurality of computational models according to communication environment conditions. For example, the first communication node may identify location information, movement information, physical layer environment information of communication nodes and/or communication obstacles existing in the communication environment. Here, the location information may include absolute coordinates and/or relative coordinates of the respective communication nodes and/or communication obstacles. The movement information may include speeds, accelerations, and the like of the respective communication nodes and/or communication obstacles. The physical layer environment information may include information such as a time at which communication is performed, temperature, humidity, and weather of the communication environment. The first communication node may acquire a separate computational model through a separate learning process for each communication environment condition classified according to the identified location information and/or movement information. In other words, each weight coefficient W and/or each computational model obtained by the first communication node through iterative learning may be classified and stored based on predetermined communication environment conditions.

The computational models classified according to the respective communication environment conditions may be utilized to immediately estimate or calculate LAP values and/or LBPs value based on the communication status information and the communication environment information identified while the first communication node performs communication in real time, and configure optimal multi-connectivity.

Alternatively, the computational models classified by the communication environment conditions may be provided to another communication node of the communication system, and stored or used by another communication node. For example, the first communication node may periodically or constantly transmit information on the computational models classified according to the communication environment conditions to other communication nodes of the communication system. Alternatively, the first communication node may receive and store information on computational models classified according to the communication environment conditions, which are periodically or constantly transmitted from another communication node of the communication system, in addition to the directly obtained computational model.

Alternatively, the first communication node may provide the computational model to another communication node (hereinafter, referred to as a second communication node) of the communication system based on a request from the second communication node. For example, the first communication node may receive, from the second communication node, communication environment information (hereinafter, second communication environment information) that the second communication node identifies while performing communication in real time. The first communication node may identify a second computational model corresponding to the received second communication environment information. The first communication node may transmit the identified second computational model to the second communication node. The second communication node may estimate or calculate LAP value(s) and/or LBP value(s) based on the second computational model received from the first communication node, and configure an optimal multi-connectivity.

On the other hand, the first communication node may estimate or calculate LAP value(s) and/or LBP value(s) based on a computational model provided from another communication node (hereinafter, referred to as a third communication node) of the communication system. For example, the first communication node may transmit, to the third communication node, communication environment information (hereinafter, referred to as third communication environment information) identified while performing communication in real time. The third communication node may transmit information of a third computational model corresponding to the third communication environment information to the first communication node. The first communication node may receive the information on the third computational model from the third communication node. The first communication node may estimate or calculate LAP value(s) and/or LBP value(s) based on the third computational model, and configure an optimal multi-connectivity.

Figure 6:
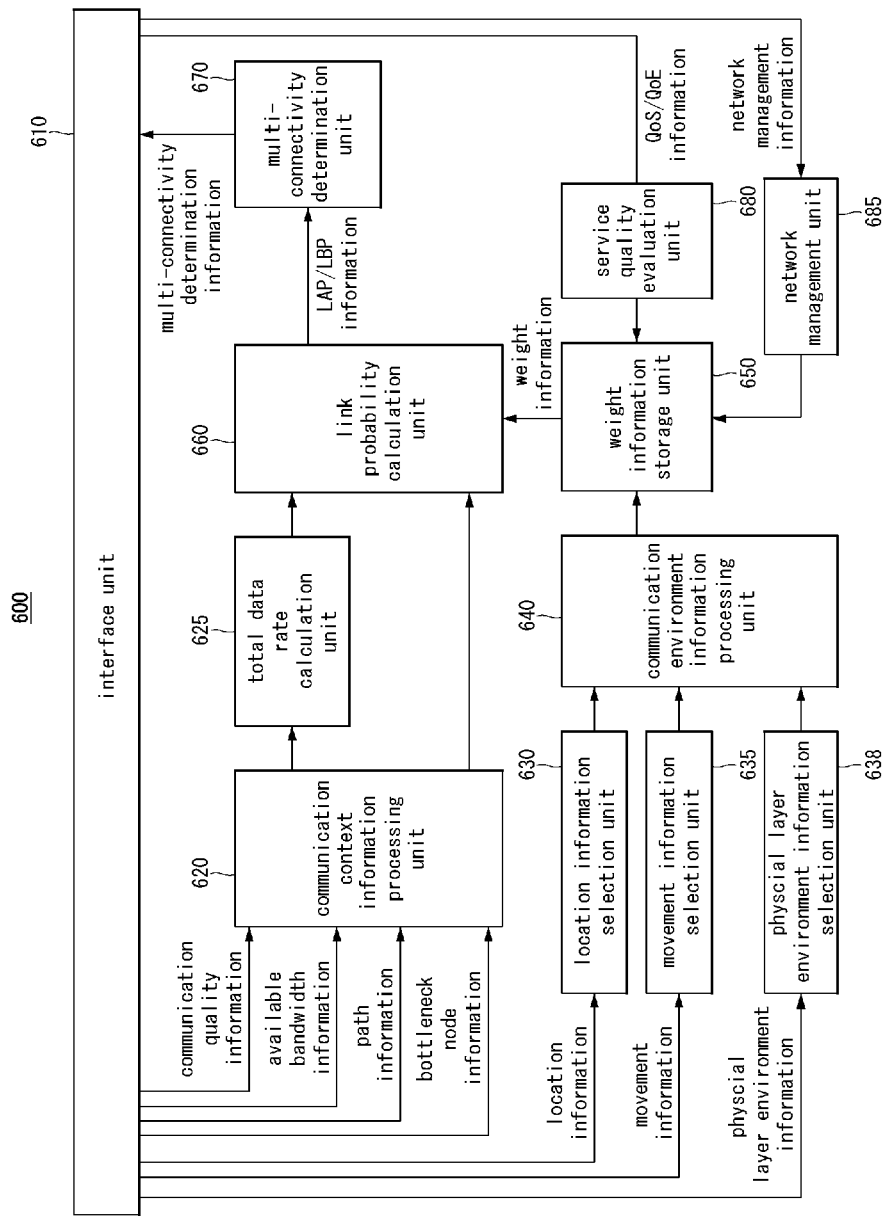
FIG. 6 is a block diagram illustrating an exemplary embodiment of a first communication node controlling multi-connectivity based on a link available probability (LAP) value.

FIG. 6 is a block diagram illustrating an exemplary embodiment of a first communication node controlling multi-connectivity based on a link available probability (LAP) value.

Referring to FIG. 6, a first communication node 600 included in an exemplary embodiment of a communication system may include components for controlling multi-connectivity based on LAP values. The first communication node 600 may comprise an interface unit 610, a communication status information processing unit 620, a total data rate calculation unit 625, a location information selection unit 630, a movement information selection unit 635, a physical layer environment information selection unit 638, a communication environment information processing unit 640, a weight information storage unit 650, a link probability calculation unit 660, a probability conversion unit 665, a multi-connectivity determination unit 670, a service quality evaluation unit 680, and/or a network management unit 685.

The first communication node 600 may include a multi-connectivity control apparatus (not shown). Here, the multi-connectivity control apparatus (not shown) may correspond to a logical component or a physical component including components for controlling multi-connectivity by the first communication node 600 based on LAP value(s). For example, the multi-connectivity control apparatus (not shown) may include some or all of the interface unit 610, the communication status information processing unit 620, the total data rate calculation unit 625, the location information selection unit 630, the movement information selection unit 635, the communication environment information processing unit 640, the weight information storage unit 650, the link probability calculation unit 660, the probability conversion unit 665, the multi-connectivity determination unit 670, the service quality evaluation unit 680, and/or the network management unit 685.

The first communication node 600 may be connected to other communication nodes of the communication system through wired/wireless communications through the interface unit 610. The first communication node 600 may transmit and receive signals such as control signals and/or data signals with other communication nodes outside the first communication node through the interface unit 610. The first communication node 600 may configure multi-connectivity with other communication nodes of the communication system or control the configured multi-connectivity. Here, the first communication node may be the same as or similar to the communication node 200 described with reference to FIG. 2, the at least one wireless terminal 340-1, 340-2, 340-3, 340-4, 340-5, and 340-6 described with reference to FIG. 3, the first communication node described with reference to FIG. 4, and/or the first communication node described with reference to FIG. 5. The communication system may be the same as or similar to the communication system 300 described with reference to FIG. 3, the communication system described with reference to FIG. 4, and/or the communication system described with reference to FIG. 5. For example, the communication system may include at least one fixed base station, and/or at least one mobile backhaul base station, and the like.

Alternatively, the multi-connectivity control apparatus (not shown) of the first communication node 600 may be connected to other components inside the first communication node 600 in a wired/wireless manner through the interface unit 610. The multi-connectivity control apparatus (not shown) may transmit and receive signals such as control signals and/or data signals with other components inside the first communication node 600 through the interface unit 610. Here, other components inside the first communication node 600 may correspond to, for example, a communication control process program, a communication modem device, and the like. The communication control process program may mean a program that can be executed by the at least one processor 210 and/or the at least one memory 220 described with reference to FIG. 2 simultaneously or in parallel with other process programs.

The first communication node 600 may communicate with other communication nodes through the interface unit 610. The interface unit 610 may include components identical or similar to the input interface device 240, the output interface device 250, or the like described with reference to FIG. 2. The first communication node 600 may control links with other communication nodes through the interface unit 610. The first communication node 600 may be simultaneously connected with a plurality of communication nodes based on multi-connectivity configured in the interface unit 610. The first communication node 600 may obtain information necessary for configuration or control operations of multi-connectivity through the interface unit 610. For example, the first communication node 600 may obtain communication status information such as communication quality information, available bandwidth information, path information, and/or bottleneck node information about a channel or link between the first communication node 600 and other communication nodes. Alternatively, the first communication node 600 may obtain communication environment information such as location information and/or movement information of other communication nodes and/or communication obstacles existing in the communication environment. The first communication node 600 may calculate or estimate LAP values based on the obtained communication status information and/or communication environment information. For example, the communication status information and/or communication environment information obtained by the first communication node 600 may be input to the link probability calculation unit 660.

The link probability calculation unit 660 may calculate link available probability (LAP) values or link blocking probability (LBP) values based on the input communication status information and/or communication environment information. Here, the LAP value may correspond to a probability that the corresponding link can be stably maintained without being blocked. The LBP value may correspond to a probability that the corresponding link may be blocked. The LBP value and the LAP value may have a relationship as LAP+LBP=1. For example, the link probability calculation unit 660 may be the same as or similar to the machine learning unit described with reference to FIG. 5.

Various machine learning structures may be applied to the link probability calculation unit 660. For example, in an exemplary embodiment of the communication system, various machine learning structures, such as an ANN structure, a DNN structure, a neuron structure composed of a single node, a perceptron structure composed of a single node, a knowledge-based system structure, a structure to which a reasoning technique (e.g., Bayesian etc.) is applied, and a deep neural network structure, may be applied to the link probability calculation unit 660. A machine learning structure selected according to predetermined criteria among the various machine learning structures may be applied to the link probability calculation unit 660. For example, a machine learning structure selected according to various conditions, such as development and/or production costs, performance requirements, and processor capabilities of the communication system and/or individual devices thereof, may be applied to the link probability calculation unit 660.

The link probability calculation unit 660 may calculate LAP values or LBP values based on a machine learning scheme. The first communication node 600 may obtain the LAP values or the LBP values by inputting the communication status information and/or the communication environment information obtained from the interface unit 610 into a predetermined machine learning structure. The first communication node 600 may directly obtain the LAP values through the machine learning structure. On the other hand, the first communication node 600 may obtain the LBP values through the machine learning structure, and may obtain the LAP values by subtracting the LBP values from 1. The first communication node 600 may control multi-connectivity based on the obtained LAP values or LBP values.

In an exemplary embodiment of the communication system, the interface unit 610 may obtain at least one communication status information such as communication quality information, available bandwidth information, path information, and/or bottleneck node information for channels or links between the first communication node 600 and other communication nodes. The communication status information obtained by the interface unit 610 may be preprocessed by the communication status information processing unit 620 for ease of operation in the machine learning structure. For example, in an exemplary embodiment of the communication system, each communication status information may be processed or scaled as a coefficient or parameter having a value from 0 to 1. The preprocessed communication status information may be configured in form of vector data and may be input to the link probability calculation unit 660 as input data. Meanwhile, each of the communication status information may be input to the total data rate calculation unit 625. The total data rate calculation unit 625 may calculate or estimate a total receive data rate based on at least one input communication status information. The total receive data rate obtained through the total data rate calculation unit 625 may be input to the link probability calculation unit 660 as input data. The link probability calculation unit 660 may calculate an LAP value or an LBP value for each link based on the input data. When the link probability calculation unit 660 calculates the LBP value, the probability conversion unit 665 may obtain the LAP value by subtracting the obtained LBP value from 1. The LAP value or LBP value for each link obtained by the link probability calculation unit 660 or the probability conversion unit 665 may be input to the multi-connectivity determination unit 670.

The multi-connectivity determination unit 670 may determine links to be used for multi-connectivity based on the acquired LAP values or LBP values for the respective links. The multi-connectivity determination unit 670 may distinguish between good links and bad links based on the input LAP values or LBP values for the respective links. The multi-connectivity determination unit 670 may determine multi-connectivity by first selecting links having relatively high LAP values or relatively low LBP values. For example, the multi-connectivity determination unit 670 may determine multi-connectivity by first selecting links having LAP values equal to or greater than a first preset probability threshold. Alternatively, the multi-connectivity determination unit 670 may determine multi-connectivity by first selecting links having LBP value less than a second preset probability threshold. However, exemplary embodiments of the present disclosure are not limited thereto and may include various control schemes based on LAP values or LBP values.

The interface unit 610 may configure multi-connectivity and perform communication based on information on the multi-connectivity determined by the multi-connectivity determination unit 670. The interface unit 610 may obtain communication quality information or service quality information according to a result of performing communication. For example, the interface unit 610 may obtain a service quality value such as Quality of Service (QoS) or Quality of Experience (QoE) according to the result of performing communication. The service quality evaluation unit 680 may receive the service quality value obtained from the interface unit 610. The service quality evaluation unit 680 may perform evaluation on output data such as the information on the multi-connectivity determined by the multi-connectivity determination unit 670 and/or the LAP values or LBP values output from the link probability calculation unit 660 based on the input quality of service value. For example, when the acquired quality of service value is equal to or greater than a preset first reference quality value, the service quality evaluation unit 680 may determine that the LAP values or LBP values, and/or the information on the determined multi-connectivity is valid. On the other hand, when the acquired quality of service value is less than the preset first reference quality value, the service quality evaluation unit 680 may determine that the LAP values or LBP values, and/or the information on the determined multi-connectivity is not valid. The service quality evaluation unit 680 may transmit the service quality evaluation result to the weight information storage unit 650. The weight information storage unit 650 may determine whether to update the weight coefficients based on the service quality evaluation result.

The interface unit 610 may obtain location information, movement information, physical layer environment information, and the like of the communication nodes and/or communication obstacles existing in the communication environment. Here, the location information may include absolute coordinates and/or relative coordinates of the respective communication nodes and/or communication obstacles. The location information obtained from the interface unit 610 may be input to the location information selection unit 630. The location information selection unit 630 may classify or select and output the input location information according to a predetermined criterion. The movement information may include speeds, accelerations, and the like of the respective communication nodes and/or communication obstacles. The location information obtained from the interface unit 610 may be input to the movement information selection unit 635. The movement information selection unit 635 may classify or select and output the input movement information according to a predetermined criterion. The physical layer environment information may include information such as a time at which communication is performed, temperature, humidity, weather, and the like of the communication environment. The physical layer environment information obtained from the interface unit 610 may be input to the physical layer environment information selection unit 638. The physical layer environment information selection unit 638 may classify or select and output the input physical layer environment information according to a predetermined criterion.

The location information and/or movement information output from the location information selection unit 630, the movement information selection unit 635, and/or the physical layer environment information selection unit 638 may be input to the communication environment information processing unit 640. The communication environment information processing unit 640 may classify and identify communication environment conditions based on the communication environment information such as the location information, the movement information, and/or the physical layer environment information. The communication environment information processing unit 640 may transmit information on the identified communication environment conditions to the weight information storage unit 650. The weight information storage unit 650 may obtain a separate computation model through a separate learning process for each communication environment condition. In other words, each weight coefficient and/or each computational model obtained by the first communication node through iterative learning may be classified and stored based on predetermined communication environment conditions. The computational models obtained for the respective communication environment conditions may be used to immediately estimate or calculate the LAP values and/or the LBP values based on the communication status information and the communication environment information identified while the first communication node performs communication in real time, and configure optimal multi-connectivity. The state, LAP value, and/or LBP value, etc. of each link may be affected by communication environment information such as the locations, movement patterns, and communication times of the first communication node 600, the neighboring communication nodes, and/or the communication obstacles, and a temperature, humidity, weather, etc. of the communication environment. The first communication node 600 has an advantage of being able to configure an optimal multi-connectivity through the communication environment information or the computational model classified according to communication environment conditions.

Alternatively, the computational models classified by the communication environment conditions may be provided to another communication node of the communication system, and stored or used by another communication node. For example, the first communication node 600 may periodically or constantly transmit information on the computational models classified according to the communication environment conditions to other communication nodes of the communication system through the interface unit 610. Alternatively, the first communication node 600 may receive information on computational models classified according to the communication environment conditions through the interface unit 610, which are periodically or constantly transmitted from another communication node of the communication system, in addition to the directly obtained computational model.

Alternatively, the first communication node 600 may provide the computational model to another communication node (hereinafter, referred to as a second communication node) of the communication system based on a request from the second communication node. For example, the first communication node may receive, from the second communication node, communication environment information (hereinafter, second communication environment information) that the second communication node identifies while performing communication in real time through the interface unit 610. The first communication node may identify a second computational model corresponding to the received second communication environment information in the weight information storage unit 650. The first communication node may transmit the identified second computational model to the second communication node through the interface unit 610. The second communication node may estimate or calculate LAP value(s) and/or LBP value(s) based on the second computational model received from the first communication node 600, and configure an optimal multi-connectivity.

On the other hand, the first communication node 600 may estimate or calculate LAP value(s) and/or LBP value(s) based on a computational model provided from another communication node (hereinafter, referred to as a third communication node) of the communication system. For example, the first communication node may transmit, to the third communication node, communication environment information (hereinafter, referred to as third communication environment information) identified while performing communication in real time through the interface unit 610. The third communication node may transmit information on a third computational model corresponding to the third communication environment information to the first communication node. The first communication node 600 may receive the information on the third computational model from the third communication node through the interface unit 610. The first communication node 600 may store the received information on the third computational model in the weight information storage unit 650. The first communication node may estimate or calculate LAP value(s) and/or LBP value(s) based on the information on the third computational model, and configure an optimal multi-connectivity.

The first communication node 600 may manage network management information transmitted and received with another communication node through the network management unit 685. Here, the network management information may include information of the computational model provided by the first communication node 600 to other communication nodes, or information transmitted by the first communication node 600 to request provision of computational models to other communication nodes. The network management unit 685 may select or determine network management information to be transmitted by the first communication node 600 to other communication nodes.

For example, the network management unit 685 may select or determine information of the computational model to be transmitted by the first communication node 600 to other communication nodes. Alternatively, the network management unit 685 may select or determine information transmitted by the first communication node 600 to other communication nodes in order to request provision of the computational model. The network management information selected or determined by the network management unit 685 may be transmitted to other communication nodes through the interface unit 610.

Meanwhile, the network management information may include information on the computational model received by the first communication node 600 from other communication nodes, or information transmitted to the first communication node 600 by other communication nodes to request provision of the computational model. The network management information received by the first communication node 600 from another communication node may be input to the network management unit 685. The network management unit 685 may perform an operation based on the input network management information. For example, the network management unit 685 may transmit information on the computational model received from other communication nodes to the weight information storage unit 650. Alternatively, the network management unit 685 may select or determine information of the computational model corresponding to the information transmitted to the first communication node 600 in order to request the provision of the computational model by other communication nodes, and configure and transmit it as network management information. If there is no computational model corresponding to the information transmitted by other communication nodes to the first communication node 600 in order to request the provision of the computational model, a signal indicating that there is no suitable computational model may be returned as being configured as network management information.

The first communication node 600 may transmit the LAP values and/or LBP values acquired using the machine learning structure to other communication nodes through the interface unit 610. Alternatively, the first communication node 600 may transfer the weight coefficient information stored in the weight information storage unit 650 to other communication nodes. Accordingly, all communication nodes constituting the communication system may identify, predict, or estimate states of the respective links and/or the state of multi-connectivity.

According to an exemplary embodiment of the present disclosure, in a wireless communication system to which a mobile backhaul network is applied, a method and an apparatus for efficiently controlling multi-connectivity between communication nodes and a fixed or mobile backhaul base station adaptively to changes in a communication environment based on machine learning may be provided. The machine learning structure of the first communication node may calculate LAP values and LBP values for the respective links between the first communication node and the fixed or mobile backhaul base station with low complexity, based on the communication status information and/or the communication environment information. Multi-connectivity may be configured using links determined to be good based on the result of the calculation. Accordingly, the structure of the mobile backhaul network having high variability according to changes in the communication environment may be controlled efficiently and with low complexity.

However, the effects that can be achieved by the method and apparatus for controlling multi-connectivity in the wireless communication system according to the exemplary embodiments of the present disclosure are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for managing links, performed by a first communication node in a communication system, the method comprising:
   obtaining, through an interface, communication status information including communication quality information for each link between the first communication node and at least one other communication node of the communication system;
   obtaining communication environment information including movement information and location information of each of the at least one other communication node;
   obtaining a plurality of link probability computational models outputting a first link probability according to input of the communication status information by iteratively performing a machine learning operation based on the communication status information and the communication environment information, each of the obtained plurality of link probability computational models corresponds to a part of the communication environment information respectively;
   selecting a specific link probability computational model corresponding to real-time communication environment information among the obtained plurality of link probability computational models; and
   calculating one or more real-time link probabilities corresponding to the first link probability to be used for real-time communication by inputting real-time communication status information into the specific link probability computational model selected among the obtained plurality of link probability computational models, wherein the first link probability is used by the first communication node to control multi-connectivity with the at least one other communication node,
wherein the obtaining of the plurality of link probability computational models comprises:
classifying the communication environment information to identify communication environment conditions;
iteratively performing the machine learning operation for each of the identified communication environment conditions; and
obtaining the plurality of link probability computational models classified according to the identified communication environment conditions, and
wherein the selecting of the specific link probability computational model comprises:
obtaining, through the interface, first communication status information corresponding to the real-time communication status information for each link between the first communication node and the at least one other communication node;
obtaining first communication environment information corresponding to the real-time communication environment information; and
identifying a first link probability computational model corresponding to the obtained first communication environment information among the obtained plurality of link probability computational models;
wherein the first communication environment information includes real-time movement information and real-time location information of each of the at least one other communication node, and the calculating of the one or more real-time link probabilities comprises:
inputting the first communication status information into the identified first link probability computational model; and
obtaining a first real-time link probability output from the first link probability computational model.

2. The method according to claim 1, wherein the first link probability corresponds to a link available probability (LAP) indicating a probability that each link with the at least one other communication node is not blocked.

3. The method according to claim 1, wherein the first link probability corresponds to a link blocking probability (LBP) indicating a probability that each link with the at least one other communication node is blocked.

4. The method according to claim 1, wherein the obtaining of the link probability computational model comprises:
performing evaluation on each link with the at least one other communication node based on the first link probability output from the link probability computational model;
determining multi-connectivity with the at least one other communication node, based on a result of the evaluation on each link with the at least one other communication node;
obtaining service quality information according to a result of determining the multi-connectivity;
performing evaluation on the first link probability output from the link probability computational model, based on the service quality information;
determining whether to update at least one weight coefficient constituting the link probability computational model based on a result of the evaluation on the first link probability; and
updating the at least one weight coefficient.

5. The method according to claim 1, wherein the communication status information further includes at least one of available bandwidth information, path information, and bottleneck node information, and the obtaining of the link probability computational model comprises:
scaling at least one piece of information included in the communication status information to have a value of 0 to 1;
configuring the scaled at least one piece of information into one vector data; and
iteratively performing the machine learning operation based on the communication status information configured as the vector data.

6. The method according to claim 1, further comprising providing a second link probability computational model to a second communication node of the communication system, wherein the providing of the second link probability computational model comprises:
receiving, from the second communication node, second communication environment information including real-time movement information and real-time location information of each of at least one communication node performing real-time communication with the second communication node through the interface;
identifying the second link probability computational model corresponding to the received second communication environment information among the obtained plurality of link probability computational models; and
transmitting information on the identified second link probability computational model to the second communication node through the interface.

7. The method according to claim 1, further comprising transferring information of at least one weight coefficient constituting the obtained link probability computational model to the at least one other communication node through the interface.

8. The method according to claim 1, further comprising transferring the first link probability for each link with the at least one other communication node to the at least one other communication node through the interface.

9. The method according to claim 1, wherein the communication environment information further includes movement information and location information of each of at least one communication obstacle existing in a predetermined communication area.

10. The method according to claim 1, wherein the communication environment information further includes physical layer environment information including a time at which communication is performed, temperature, humidity, and/or weather.

11. The method according to claim 1, further comprising calculating a third real-time link probability based on a third link probability computational model provided from a third communication node of the communication system, wherein the calculating of the third real-time link probability comprises:
obtaining, through the interface, first communication status information corresponding to the real-time communication status information for each link between the first communication node and the at least one other communication node;
obtaining first communication environment information corresponding to the real-time communication environment information;
transmitting the first communication environment information to the third communication node through the interface;

receiving, from the third communication node, the third link probability computational model corresponding to the first communication environment information through the interface;
inputting the first communication status information to the third link probability computational model; and
obtaining the third real-time link probability output from the third link probability computational model,
wherein the first communication environment information includes real-time movement information and real-time location information of each of the at least one other communication node.

12. A first communication node in a communication system, the first communication node comprising:
an interface;
a processor;
a memory electronically communicating with the processor; and
instructions stored in the memory,
wherein when executed by the processor, the instructions cause the first communication node to:
obtain, through the interface, communication status information including communication quality information for each link between the first communication node and at least one other communication node of the communication system;
obtain communication environment information including movement information and location information of each of the at least one other communication node;
obtain a plurality of link probability computational models outputting a first link probability according to input of the communication status information by iteratively performing a machine learning operation based on the communication status information and the communication environment information, each of the obtained plurality of link probability computational models corresponds to at least a part of the communication environment information respectively;
select a specific link probability computational model corresponding to real-time communication environment information among the obtained plurality of link probability computational models; and
calculate one or more real-time link probabilities corresponding to the first link probability to be used for real-time communication by inputting real-time communication status information into the specific link probability computational model selected among the obtained plurality of link probability computational models,
wherein the first link probability is used by the first communication node to control multi-connectivity with the at least one other communication node,
wherein in the obtaining of the plurality of link probability computational models, the instructions further cause the first communication node to:
classify the communication environment information to identify communication environment conditions;
iteratively perform the machine learning operation for each of the identified communication environment conditions; and
obtain the plurality of link probability computational models classified according to the identified communication environment conditions, and
wherein in the selecting of the specific link probability computational model, the instructions further cause the first communication node to:

obtain, through the interface, first communication status information corresponding to the real-time communication status information for each link between the first communication node and the at least one other communication node;
obtain first communication environment information corresponding to the real-time communication environment information;
identify a first link probability computational model corresponding to the obtained first communication environment information among the obtained plurality of link probability computational models;
input the first communication status information into the identified first link probability computational model; and
obtain a first real-time link probability output from the first link probability computational model,
wherein the first communication environment information includes real-time movement information and real-time location information of each of the at least one other communication node.

13. The first communication node according to claim 12, wherein the instructions further cause the first communication node to:
perform evaluation on each link with the at least one other communication node based on the first link probability output from the link probability computational model;
determine multi-connectivity with the at least one other communication node, based on a result of the evaluation on each link with the at least one other communication node;
obtain service quality information according to a result of determining the multi-connectivity;
perform evaluation on the first link probability output from the link probability computational model, based on the service quality information;
determine whether to update at least one weight coefficient constituting the link probability computational model based on a result of the evaluation on the first link probability; and
update the at least one weight coefficient.

14. The first communication node according to claim 12, wherein the communication status information further includes at least one of available bandwidth information, path information, and bottleneck node information, and the instructions further cause the first communication node to:
scale at least one piece of information included in the communication status information to have a value of 0 to 1;
configure the scaled at least one piece of information into one vector data; and
iteratively perform the machine learning operation based on the communication status information configured as the vector data.

15. The first communication node according to claim 12, wherein the instructions further cause the first communication node to:
receive, from a second communication node of the communication system, second communication environment information including real-time movement information and real-time location information of each of at least one communication node performing real-time communication with the second communication node through the interface;
identify a second link probability computational model corresponding to the received second communication environment information among the obtained plurality of link probability computational models; and transmit information on the identified second link probability computational model to the second communication node through the interface.

16. The first communication node according to claim 12, wherein the instructions further cause the first communication node to:

obtain, through the interface, first communication status information corresponding to the real-time communication status information for each link between the first communication node and the at least one other communication node;

obtain first communication environment information corresponding to the real-time communication environment information;

transmit the first communication environment information to a third communication node of the communication system through the interface;

receive, from the third communication node, a third link probability computational model corresponding to the first communication environment information through the interface;

input the first communication status information to the third link probability computational model; and obtain a third real-time link probability output from the third link probability computational model, wherein the first communication environment information includes real-time movement information and real-time location information of each of the at least one other communication node.

* * * * *